Patented June 15, 1943

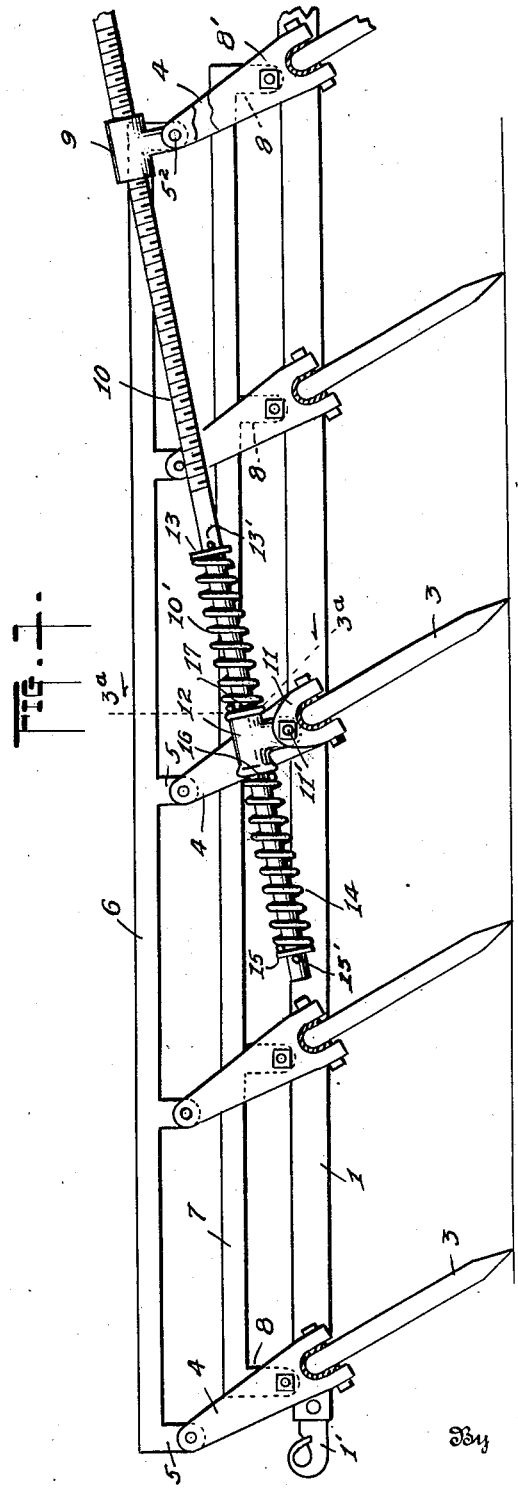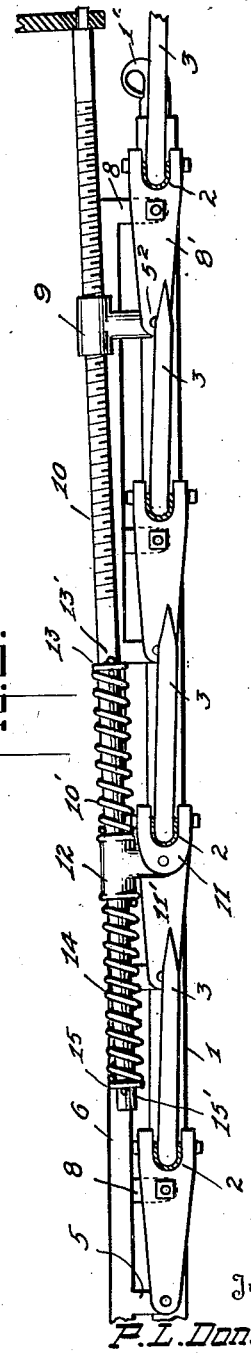

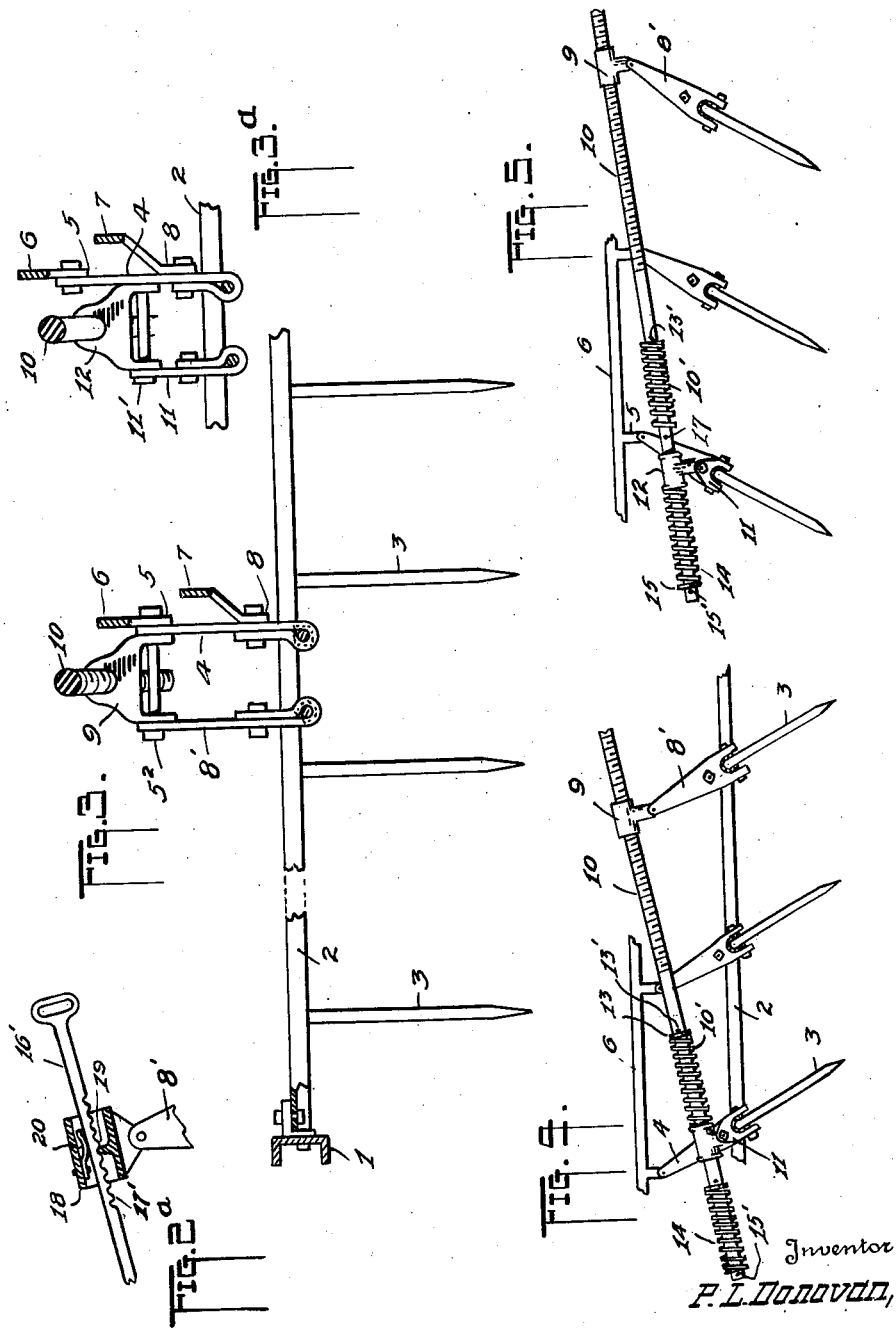

2,321,663

UNITED STATES PATENT OFFICE 2,321,663

HARROW

Patrick L. Donovan, Kewanee, Ill.

Application October 7, 1940, Serial No. 360,120

19 Claims. (Cl. 55—131)

This invention pertains to spike tooth harrows, or so called "drag" type of harrows.

An object of the invention is to provide a novel structure by which the parts of harrow such as the frame and teeth, and the means employed in providing tooth adjustments in the field, can be collapsed as a whole so as to occupy but a minimum of space as an advantage in storage and shipping.

Another and important object is to furnish means by which the harrow teeth may have yielding engagement with the soil being worked during either direction of harrow travel, and so that the harrow as a whole can be collapsed in either of two directions.

Again, an object is to provide for a "floating" action of the harrow by the introduction of yieldable means associated with the employed structure for imparting angular adjustment of the teeth to the end that whether the implement is drawn in one direction or the other the teeth thereof may have a yielding action during their travel.

An object, also, is to furnish in a harrow a structure of such nature that a spring included therein in control of the harrow teeth is so disposed and controlled that when the horrow teeth have upright positions the tension thereon will be greater than when the teeth have angular positions, such tension decreasing with increased tooth angularity.

Further, an object lies in the particular manner of connecting mountings carrying a threadbar or other form of control means used for tilting the teeth, to the end that the harrow when collapsed will occupy the least space possible.

Another important object lies in furnishing a harrow structure which provides for a complete and wholly compact folding or collapsing of the harrow members in either of two positions, and from either of which positions the structure may be lifted or extended to an operating position, the structure being such, also, that even a very slight degree of angular adjustment of the teeth is made possible.

Further, an object is to so dispose certain of the parts of the structure of the harrow that the forces acting upon the harrow teeth during harrowing operations will be directed initially upon those teeth lying at the mid-portion of the frame thereby bringing about a steadying action of the implement.

A further object is to provide an arrangement in a harrow wherein the flat collapsing of the implement, and the means for providing flexibility of its parts during travel in the field are combined in a structure of very simple but effective form.

That the invention may be understood the appended drawings are provided as part hereof:

Figure 1 is a longitudinal sectional elevation of a harrow constructed according to the present invention;

Figure 2 is a view similar to Figure 1 but wherein the harrow is shown in a collapsed position;

Figure 2$^a$ is a slight modification of a part of a control means, produced on a smaller scale than Figures 1 and 2;

Figure 3 is an elevation in part section of part of harrow as viewed from the right in Figure 1;

Figure 3$^a$ is an elevation of parts shown in Figure 1 taken on line 3$^a$—3$^a$ of that figure;

Figure 4 is a detail in side elevation of certain parts only, shown in Figures 1 and 2 produced on a smaller scale, and Figure 5 is a view similar to Figure 4 but showing different adjusted positions of the said parts.

In the figures 1 denotes one of the side or frame members of the harrow, the same having a draft attachment 1' at each end, as noted in Figures 1 and 2, while 2 indicates the several tooth-carrying bars associated with the said side member and its companion, not shown, said bars being so mounted as to rotate about their longest axes, the mounting means for permitting such action being without invention herein, the harrow teeth being identified by 3 and affixed to the named bars by any usual or approved method.

In this instance, partially embracing, but affixed to each bar 2 substantially at the middle of the length thereof, is an upstanding lever-arm 4 to each of which is pivotally connected a depending extension 5 of a reach 6, said reach being common, therefore, to all of the arms so that all of the latter may swing in unison and to the same degree in any rocking action of the named harrow tooth bars 2.

A reach 7 similar to the reach 6 has depending extensions 8 each of which is pivotally connected to one of the said lever-arms 4 in close proximity to a tooth bar 2, merely serving to brace the latter for preventing lateral springing thereof.

Upstanding from an outermost bar 2, for example, or that at the extreme right in Figure 1, is an arm 8' which in this instance is of the same length as the arm 4 of that bar and spaced therefrom as shown in Figure 3, there being swung between the thus constituted companion arms by a bolt 5², for example, a freely swiveled bored part such as a threaded nut 9 to receive a thread-bar 10 and constituting a support for the latter. Upstanding also from and affixed to bar 2 at about the middle of the harrow, in this instance, is an arm 11 which, is shorter than its companion arm 4, for a purpose to appear, there being likewise swung between the two on a bolt 11', for example, a guide 12 to receive an unthreaded portion of the said thread-bar 10, said guide forming a second support for said thread bar. A coil spring 10' encircles the thread-bar between the nut 9 and guide 12, which at one end abuts the latter, there being an abutment means for the other end of the spring, such as washer 13, and a cotter pin 13', for example, the latter extending through the thread-bar at a position spaced from said guide. The extremity of the thread-bar projecting from the guide 12 may also carry a spring 14 which at one end may abut the said guide, its other end abutting a washer 15 and a cotter pin 15'.

In the position of the harrow parts shown in Figures 1 and 4, the teeth 3 are slanted rearwardly, considering that the harrow is moving toward the left. It will be seen that due to the presence of the spring 10' between the guide 12 and pin 13' the harrow frame will have a floating action. This floating action results from the fact that as the teeth drag over the soil all of the arms 4 and arm 8 which are rigid therewith will swing in the direction of travel and since the thread-bar is forced in the direction of its length forwardly or toward the left, it will shift within the guide 12 compressing the spring 10' more or less between the said guide and the cotter pin 13' according to the degree of obstruction met by the tooth-points.

Let it be supposed now that the harrow is to be drawn in an opposite direction or toward the right. Since the hitch will have been changed to the opposite end of the implement, the thread-bar is operated to slant the teeth to positions opposite their positions shown in Figures 1 and 4, or as shown in Figure 5. Either spring 10', 14 may normally be under more or less tension between the guide 12 and an adjacent cotter-pin in order to properly meet pressure thrown against said guide as the harrow teeth meet resistance.

Naturally, as the pressure upon a spring is increased it is further compressed to thereby meet and oppose the increased drag on the teeth. Depending upon the direction of travel, of course, one spring or the other is brought into service in the manner mentioned.

Change in direction of harrow travel may be occasioned, by the desire to present sharper points of the teeth to the work as they become worn on one side.

When desired, the rigid relation of the parts of the harrow may be maintained. That is to say, by inserting a cotter pin in the thread-bar at 16 or 17 adjacent the guide 12, depending upon the direction of travel, the thread-bar will be held fixedly within the said guide.

Coming now to the matter of collapsing the harrow, it is noted in Figure 2 that collapsing has taken place by continuing the tilting of the teeth 2 in the same direction as suggested in Figure 1.

Due to the fact that the nut 9 and the guide 12 are swiveled on their respective arms 4—8 and 4—11, the thread-bar as it lowers approaches very closely to a horizontal position, or one well within the limits of the balance of the structure, including the reaches 6 and 7 and their relation to the arms 4, said reaches lying substantially flush with each other as shown in Figure 2.

Since the reaches lie in a lowest position in the collapsed form of the implement, and since the thread-bar lies also at a very low point the vertical height of the whole is practically at a minimum.

That the parts of the harrow may have complete collapse in either direction of collapsing action the guide 12 and the nut 9 each has a depending lateral extension and since the places of pivoting of these extensions with the lever-arms 4 lie in line with the longest measurement of said lever-arms these members will be permitted to lie in line with the entire series of teeth as shown in Figure 2, for example, without interference of the bar 10 or with those portions of the guide 12 and nut 9 through which the bar extends, nor with the reach 6, and therefore the teeth may be swung through 180° from one extreme position in the folding of the harrow to an opposite extreme position.

The manner of associating the nut 9 and guide 12 with the arms 4 by swivel connections is important in that while controlling the adjustment of the tooth bars 2 by the swiveling of those parts as described, the thread-bar besides being free to rock vertically with the swivel parts is permitted to reach a quite low position in the collapsed position of the structure.

The close folding of the harrow parts is possible in either direction of thread-bar rotation.

Of considerable important is the fact, previously referred to, that the lever 4—8' carrying the nut 9 and lever 11 carrying the guide 12 are of unequal length. From this fact it is clear that in a swinging movement of said lever 4—8' with its rocking tooth-bar mounting the said nut will swing through a greater arc than does the guide 12 of the said shorter lever 11. For that reason, therefore, there is a lag in travel-time of the said guide compared with that of said nut and the spring to be affected is, in consequence, placed under more or less compression depending upon the degree of movement imparted. Naturally, the less movement imparted the less will be the spring compression.

When the harrow teeth stand in a substantially vertical position and the spring is under greatest compression the soil will be most thoroughly stirred since the teeth are held more rigidly. And it follows that as the teeth are moved to angular positions the spring will be compressed less and less and less soil scarification results as tooth angularity increases. It will be clear that the springs can exert greater force for action of the teeth as the latter reach a more upright position when it is realized that as the thread-bar in its adjustment reaches positions more nearly paralleling the plane of the harrow where said springs have a greater leverage, and contrariwise, as the thread-bar has a more angular position the leverage must be less.

The operator has but to adjust the teeth for the angularity that yields the required resistance to the spring tension in accordance with desired intensity of soil treatment.

The adjustment means shown in Figure 2ª, as a modification of that illustrated in the other figures may comprise a bar or rod 16' corresponding in position to the thread-bar 10, said bar or rod having a series of teeth 17' and being shiftable through a housing 18, the latter having an abutment 19 to engage between any two of said teeth 18. A spring 20, for example, carried in the housing may serve to maintain the engagement of the named parts, said housing being pivotally mounted on the arms 4—8' as described in respect to the nut 9.

It is to be understood that by including this modification I thus indicate that other types of arrangement in place of the said thread-bar 10 may be used.

Believed to be novel in the structure is any means serving at once as an adjustment means for providing for tooth angularity as well as for harrow collapsing together with the spring arrangement to provide for the floating action described while the teeth are angled in either direction, the whole being so organized that the parts lie within the named narrow limit when collapsed.

Due to the fact that the nut 9 and the guide 12 are pivotally related to the levers 8' and 11, respectively, so that they are free to swing to wide limits with respect thereto, and also to the fact that all of the teeth-carrying levers and the teeth lie in straight lines relatively, the collapse of the implement in either folded position can be a total one since all of the parts may lie in the closest order. This is an important advantage for the reason that whether the implement is in use in travel toward the left as viewed in Figure 4 as the harrowing position, or toward the right as in Figure 5, total collapse may be brought about from either of those positions. The limit of compactness of folding is necessary if shipping and storage space is to be conserved. Were the structure such that the minimum space could be obtained by folding in one direction only the requirement would at once arise of having to operate the threadbar 10 from an extreme position of tooth-cant to an opposite position where the folded form would be a compact one.

Another advantage in use in the field is that the implement has a more steady action in that it holds itself more closely to its work than is true of other implements of this general type. In considering Figure 1 of the drawings, for example, it is observed that the lever 4 at the extreme right has greater leverage upon the threadbar during field use than has the lever 11 at the guide 12 due to the difference in length of such levers. Although the several lever-arms 4 are connected by the reach 6 so that though the forces would seem to be distributed throughout the structure, yet the diagonally downward action or thrust of the threadbar upon the lever 11 sets up the steadying action causing the implement to be held in close working relation to the soil by reducing the tendency of the teeth to "bob" and to ride over the ground being worked.

I claim:

1. In a harrow, the combination with a framing and tooth carrying bars rockably mounted therein, of a structure including a pair of levers each separately and rigidly connected with and extending laterally from a bar, a guide swiveled on one of the levers, a part swiveled on another of the levers, a bar shiftable within the guide and shiftable with respect to the said part, coacting means on the last named bar and on the said part to engage each other for maintaining a given adjustment of said bar through said part, a stop carried by the said last named bar spaced from the guide, and a compressible spring on the bar interposed between the said stop and said guide.

2. In a harrow, the combination with a framing and rockable tooth carrying bars, of a structure including a pair of levers each in control of a tooth bar, a threaded nut swiveled on one of the levers, a guide swiveled on the other of said levers, a thread-bar engaging in said nut and also mounted in the guide to shift lengthwise therein, a spring carried by the thread-bar, and a stop on the latter, said spring being compressible between the stop and one of the described swiveled elements.

3. In a harrow, the combination with a framing and rockable tooth carrying bars mounted therein, of a structure including a pair of levers each affixed to a tooth bar, a threaded nut swiveled on one of the levers, a thread-bar engaging in said threaded nut a guide swiveled on another lever to carry the said thread-bar, the latter adapted to freely shift lengthwise in said guide, a stop member carried by the thread-bar in spaced relation to one of the swiveled elements, and a spring compressible between the element and said stop in an adjustment of the thread-bar within the nut, one of the swiveled elements lying nearer the place of mounting on the tooth bar of the lever carrying said element than does the other element.

4. In a harrow, the combination with a framing and rockable tooth carrying bars mounted therein, of a structure including a pair of levers each affixed to a tooth bar, a threaded nut swiveled on one of the levers, a thread-bar engaging in said nut, a guide swiveled on the other lever to carry the said thread-bar, the latter adapted to shift lengthwise in said guide, a stop member carried by the thread-bar in spaced relation to one of the swiveled elements, and a spring compressible between the element and said stop in an adjustment of the thread-bar within the nut, the swiveled element through which the thread-bar is freely shiftable lying nearer the place of mounting on the tooth bar of the lever carrying that element than does the other of the elements.

5. In a harrow, in combination with a series of mounted rockable tooth-carrying bars each having in fixed relation therewith an upstanding lever-arm, and a reach pivotally connected to and between the several arms, of an operating member to swing the lever arms for rocking said bars about their mountings, a supporting portion swiveled on each of two of the lever arms to rock both with and relative to said arms, said operating member being carried by both portions and adjustable in and with respect to one of them, and when operated being positively movable lengthwise with respect to the same and normally shiftable through the other of the portions, and means interposed between the member and the last named portion for moving said portion in a movement of said member.

6. In a harrow, in combination with a series of mounted rockable tooth carrying bars each having a lever arm extending in fixed relation therefrom adapted to swing in the rocking of said bars, and a reach pivotally connected to and connecting the lever-arms, a nut swiveled on one of the lever-arms, a guide swiveled on another of the lever-arms, said nut and guide both adapted to swing both with and relative to the lever arm in a direction paralleling the direction of swing of the latter, a threadbar having engagement with the nut, said thread-bar being slidable in the guide, a stop portion on the thread-bar, and an elastic member on said bar lying between the stop portion and the guide and abutting both.

7. In a harrow, in combination with a series of mounted rockable tooth carrying bars, each having an upstanding lever-arm rockable therewith, and a reach connecting the arms, a supporting portion swiveled on each of two of the lever-arms to swing in a plane paralleling the direction of swing of the said arms, and to swing relative thereto, a thread-bar mounted to rotate in the supporting portions, said thread-bar having threaded engagement with one of said portions and normally shiftable through the other of the portions, and means preventing endwise movement of the thread-bar within the last named portion in one direction.

8. In a harrow, in combination with a series of mounted rockable tooth carrying bars, each having an upstanding lever-arm rockable therewith and a reach pivoted to and connecting the several said lever-arms, a supporting portion swiveled on each of two of the lever-arms to swing in a plane paralleling the direction of swing of the said arms, and each adapted to swing relative thereto, a thread-bar mounted to rotate in the supporting portions, said thread-bar being threaded into one of said portions and shiftable through the other of said portions, and yieldable means limiting the movement of the threadbar through the last named portion.

9. In a harrow, in combination with a series of mounted rockable tooth carrying bars, each having an upstanding lever-arm rockable therewith, and a reach connecting the arms, a supporting portion swiveled on each of two of the lever-arms to swing in a plane paralleling the direction of swing of the arms, and also adapted to swing relative thereto, a thread-bar mounted to rotate in the supporting portions, said thread-bar having threaded engagement with one of said portions while adapted to shift endwise in the other of the portions, a stop portion on the thread-bar, a spring interposed between the stop portion and the supporting portion through which the said thread-bar is slidable, and means attachable to the thread-bar for preventing said endwise movement of the thread-bar within the last named portion in the direction of the spring.

10. In a harrow, in combination with a series of mounted rockable tooth carrying bars, each having an upstanding lever-arm rockable therewith, and a reach connecting the arms, a supporting portion swiveled on each of two of the lever-arms to swing in a plane paralleling the direction of swing of the said lever arms, and also adapted to swing relative thereto, a thread-bar mounted to rotate in the supporting portions, said thread-bar having threaded engagement with one of said portions and adapted to shift endwise thereof in the other of the portions, a stop portion on the thread-bar at each side of the portion through which said thread-bar is slidable, a spring interposed between each stop portion and the last named portion, and a stop portion attached in fixed position on the thread-bar at either side of the said last named portion.

11. In a harrow, in combination with a framing and rockable tooth bars mounted therein, and a structure including a pair of levers each separately and rigidly connected with and extending laterally from a bar, a guide swiveled on one of the levers, a supporting portion swiveled on the other of the levers, a bar normally shiftable endwise with respect to the guide and shiftable with respect to said portion, coacting means on the last named bar and on said portion engageable with each other by which said bar may impart positive movement to the portion, and means carried by the bar adapted to abut the guide for limiting the shifting movement of those members relatively.

12. In a harrow, the combination with a framing and rockable tooth bars mounted therein, of a structure including a pair of levers each separately and rigidly connected with and extending laterally from a bar, one of the levers being longer than the other, a guide swiveled on the shortest of the two levers, a supporting portion swiveled on the other of the levers, a bar normally shiftable endwise within the guide, coacting means on the last named bar and on said portion operatively engageable with each other, and means carried by the bar at each side of the guide adapted to be brought into abutment therewith for limiting the shifting of the bar and guide relatively.

13. In a harrow, the combination with a framing, rockable tooth carrying bars mounted therein, and a structure including levers each separately and rigidly connected to and extending from a bar together with a reach connecting the levers, of a supporting portion swiveled on an outer extremity of one of the levers, a guide swiveled on another of the levers at a position close to the tooth bar on which that lever is carried and thus widely spacing the places of swiveling of the said portion and guide from each other in respect to vertical height, said guide having a position substantially at the middle of the implement in respect to the line of advance thereof, a bar operatively engaging the portion and adjustable relative thereto, said bar being normally shiftable endwise within the guide, and means to limit the shifting movement of the bar and guide relatively.

14. In a harrow, the combination with a framing, rockable tooth carrying bars mounted therein, and a structure including levers each separately and rigidly connected to and extending from a bar together with a reach connecting the levers, of a supporting portion swiveled on an outer extremity of one of the levers, a guide swiveled on another of the levers at a position close to the tooth bar on which that lever is carried and thus widely spacing the place of swiveling of the portion and guide from each other in respect to vertical height, said guide having a position substantially at the middle of the implement in respect to the line of advance, a bar operatively engaging the portion and adjustable relative thereto, said bar being normally shiftable endwise within the guide, and a spring at each side of the guide, each spring adapted to abut the same and each fixed at one extremity with respect to the said bar.

15. A harrow including in its construction a framing, rockable tooth carrying bars mounted therein, a lever arm extending from either bar, a reach connected to and connecting the several levers, the places of connection of the reaches with the lever-arms lying substantially in line with the teeth in their longest measurement, a supporting portion swiveled to the extremity of one of the named lever-arms remote from the bar carrying it, a guide swiveled on another of the lever-arms in close proximity to the tooth carrying bar having that lever-arm, a bar movable lengthwise through said supporting portion and adapted to be fixed in adjusted relations therein, said bar being normally shiftable endwise through the guide and being angled downwardly from said portion to said guide in the operating position of the harrow parts, and means carried by the bar and held thereby at each side of the guide adapted to abut said guide for limiting the movement of the bar and guide relatively.

16. In a harrow, the combination with a framing, harrow tooth carrying bars rockably mounted therein, a lever-arm affixed to and extending from each bar, and a reach pivoted to and connecting the several lever-arms, of a supporting portion pivoted to one of the lever-arms at an extremity thereof remote from the tooth bar carrying said lever-arm, a supporting portion pivoted to another of the lever-arms in close proximity to the tooth carrying bar from which that lever-arm extends, a bar carried by both said portions and angling diagonally downward from one to the other of the portions, said bar being normally freely shiftable with respect to one of the portions and engageable with the other portion to have fixed positions therein while also adapted to be moved therethrough, and a spring held in fixed relation at one end with respect to the bar and adapted to abut upon that portion through which said rod is normally freely shiftable.

17. In a harrow, the combination with a frame, tooth bars swingably hung thereon including harrow teeth, and a lever-arm fixed to each tooth bar, of a structure including a reach connecting the lever-arms and pivoted to each, the place of pivoting of a lever-arm with said reach lying in line with the longest measurement of the tooth corresponding to that lever-arm, a supporting portion constituting a guide provided with a lateral extension, said extension being pivoted to one of the named lever-arms in a position adjacent to and in line with the tooth and that arm and in line with the said pivotal connection of the latter with said reach, a bar supported in and shiftable with respect to the guide substantially at right angles to the said lateral extension, a second supporting portion for said bar having a lateral extension pivoted to another of the lever-arms at a position in line with the tooth carried thereby, said bar being shiftable with respect to the said second supporting portion and engageable therewith for adjustment therein by which to fix said bar in any one of several positions longitudinally with respect thereto, and means carried by the bar at each side of the supporting guide to abut the same, said means limiting the movement of the bar through said guide.

18. In a harrow, the combination of a horizontally extending frame, a plurality of tooth carrying structures and their teeth, each structure being rockably mounted with respect to said frame and each structure including a horizontally extending element, said teeth being spaced along the length of said element and carried thereby and projecting therefrom, said horizontally extending elements being pivotally mounted to rock on their lengthwise axes, operating means pivotally connected with and between two of said tooth carrying structures adapted to adjust and hold the teeth at any given angle and capable of swinging the teeth with respect to the frame from one extreme folded position at the latter to an opposite extreme folded position through a swing of said teeth of substantially 180 degrees.

19. In a harrow, the combination of a horizontally extending frame, a plurality of tooth carrying structures and their teeth, each structure being rockably mounted with respect to said frame to pivot on horizontal axes, a common element connected to each tooth carrying structure whereby a rocking movement of all tooth carrying structures is the same, said teeth extending from the pivotal axes of said tooth carrying structures and being adapted to extend therefrom downwardly or optionally to either side, a guide pivoted to one of the structures closely adjacent that point about which that structure rocks, a part pivoted to another of the structures distant from the point about which that structure rocks, and means operatively engaging the guide and said part to adjust and hold the teeth at any given angle and also capable of swinging the teeth with respect to the frame from one extreme folded position at the latter to an opposite extreme folded position through a swing of said teeth substantially 180 degrees.

PATRICK L. DONOVAN.